United States Patent

Inuzuka et al.

[11] Patent Number: 6,024,773
[45] Date of Patent: Feb. 15, 2000

[54] METHOD OF FABRICATING A LITHIUM ION SECONDARY BATTERY

[75] Inventors: Takayuki Inuzuka; Yasuhiro Yoshida; Michio Murai; Kouji Hamano; Hisashi Shiota; Shou Shiraga; Shigeru Aihara, all of Tokyo, Japan

[73] Assignee: Mitsushita Denki Kabushiki Kaisha, Tokyo, Japan

[21] Appl. No.: 08/996,319

[22] Filed: Dec. 22, 1997

[30] Foreign Application Priority Data

Dec. 26, 1996 [JP] Japan ................................. 8-347605

[51] Int. Cl.[7] ..................... H01M 10/40; H01M 10/38
[52] U.S. Cl. ......................... 29/623.4; 29/623.5
[58] Field of Search ................... 29/623.5, 623.4

[56] References Cited

U.S. PATENT DOCUMENTS 4,153,759   5/1979   Murata et al. .
5,512,389   4/1996   Dasgupta et al. .
5,741,609   4/1998   Chew et al. .

Primary Examiner—John S. Maples
Attorney, Agent, or Firm—Oblon, Spivak, McClelland, Maier & Neustadt, P.C.

[57] ABSTRACT

To provide a process for producing a lithium ion secondary battery which can have any arbitrary shape, such as thin shape, and yet exhibits high performance. In a method of fabricating a battery comprising a positive electrode 1, a negative electrode 4, and a separator 7, a binder resin solution mainly comprising polyvinylidene fluoride is applied to the separator 7, and the positive electrode 1 and the negative electrode 4 are laid thereon, followed by drying to form a battery laminate, which is then impregnated with an electrolytic solution.

17 Claims, 1 Drawing Sheet

METHOD OF FABRICATING A LITHIUM ION SECONDARY BATTERY

BACKGROUND OF THE INVENTION

1. Field of the Invention

This invention relates to a method of fabricating a secondary lithium ion battery. More particularly, it relates to a method of fabricating a secondary lithium ion battery which can have an arbitrary shape, a reduced thickness, and a reduced weight.

2. Description of the Related Art

In order to meet the demand for size and weight reduction of portable electronic equipment, it has been the most important subject to increase capacity of batteries used therein, and development and improvement of a variety of batteries have been proceeding. Out of available batteries, a secondary lithium ion battery is expected to achieve the highest capacity and will undergo successive improvements.

A secondary lithium ion battery primarily comprises a positive electrode, a negative electrode, and an ion conducting layer interposed between the electrodes. The secondary lithium ion batteries that have been put to practical use employ an ion conducting layer made of a porous film of polypropylene, etc. filled with an electrolytic solution.

In the currently available secondary lithium ion batteries, electrical connections among the positive electrode, the ion conducting layer, and the negative electrode are maintained by using a rigid case made of stainless steel, etc. to apply pressure to the electrode body. However, such a rigid case occupies a large proportion in the weight of a battery, limits the possibility of size and weight reduction, and makes it difficult to make a battery of arbitrary shape.

In order to achieve size-and weight reduction and freedom of shape design, it is necessary to contact the positive electrode and the negative electrode to the ion conducting layer and to retain the contact condition without applying pressure externally.

In this regard, U.S. Pat. No. 5,437,692 proposes forming an ion conducting layer of a lithium ion-conducting polymer and contacting positive and negative electrodes to the ion conducting layer via an adhesive containing a lithium compound. Further, WO95/15589 proposes forming a plastic ion conducting layer and contacting positive and negative electrodes via the plastic ion conducting layer.

However, the process of U.S. Pat. No. 5,437,692 neither provides sufficient adhesive strength nor achieves sufficient reduction in battery thickness, and the resulting battery have unsatisfactory battery characteristics, such as charge and discharge characteristics, due to high resistance to ionic conduction between the ion conducting layer and each of the positive and negative electrodes. Use of a plastic ion conducting layer for contacting the electrodes disclosed in WO95/15589 fails to obtain sufficient adhesive strength and does not lead to sufficient reduction in battery thickness.

The present invention has been completed in an attempt to solve the above problem. It provides a process for producing a secondary lithium ion battery, by which a positive electrode and a negative electrode can be intimately contacted to an ion conducting layer (separator) via an adhesive resin to secure sufficient adhesive strength between each electrode and the separator and to control the resistance to ionic conduction between each electrode and the separator within a level of that of batteries having a conventional rigid case.

The present invention relates to a method of mounting a laminate body of a secondary lithium ion battery, particularly in characterized in that a binder resin solution consisting mainly of polyvinylidene fluoride and a solvent is applied onto a separator instead of electrode.

A first aspect of the method of the present invention of fabricating a secondary lithium ion battery comprises the steps of:

forming a positive electrode and a negative electrode by providing a positive electrode active material layer and a negative electrode active material layer on respective current collectors, applying a binder resin solution consisting mainly of polyvinylidene fluoride and a solvent onto a separator, forming a battery laminate by contacting the positive electrode and the negative electrode each on each side of the separator and drying the laminate to evaporate the solvent, and impregnating the battery laminate with an electrolytic solution.

A second aspect of the method of the present invention of fabricating a secondary lithium ion battery is the method according to the first aspect wherein the binder resin solution consists of 3 to 25 parts by weight of polyvinylidene fluoride and diethylformamide as a solvent.

A third aspect of the method of the present invention of fabricating a secondary lithium ion battery is the method according to the first aspect wherein the binder resin solution consists of 5 to 15 parts by weight of polyvinylidene fluoride and diethylformamide as a solvent.

A fourth aspect of the method of the present invention of fabricating a secondary lithium ion battery is the method according to the second aspect wherein, the step of drying the battery laminate is carried out in an air stream at 80° C. or lower.

A fifth aspect of the method of the present invention of fabricating a secondary lithium ion battery is the method according to the first aspect wherein the separator is subjected to a plasma treatment prior to the step of applying the binder resin solution.

A sixth aspect of the method of the present invention of fabricating a secondary lithium ion battery is the method according to the first aspect wherein the step of forming a battery laminate comprises a step of heating a laminated body while pressing.

A seventh aspect of the method of the present invention of fabricating a secondary lithium ion battery is the method according to the sixth aspect wherein the step of impregnating comprises a step of dipping the laminated body into the lithium ion-containing electrolytic solution and a step of injecting them while reducing pressure of the lithium ion-containing electrolytic solution.

An eighth aspect of the method of the present invention of fabricating a secondary lithium ion battery is the method according to the sixth aspect wherein the step of impregnating further comprises a step of drying the laminated body while heating.

A ninth aspect of the method of the present invention of fabricating a secondary lithium ion battery is the method according to the sixth aspect wherein the step of impregnating comprises steps of:

covering the laminated body with a flexible package;

fitting air-tightly outsides of the laminated body to the flexible package by exhausting the flexible package;

injecting the lithium ion-containing electrolytic solution from an opening of the flexible package into said separator, said active material layers and said therebetween in the laminated body, and sealing the opening of the flexible package.

A tenth aspect of the method of the present invention of fabricating a secondary lithium ion battery is the method according to the ninth aspect wherein the flexible package is made of resin laminated aluminum and the step of sealing comprises a step of heat-pressing.

DETAILED DESCRIPTION OF THE PREFERRED EMBODIMENT

Figure 1:
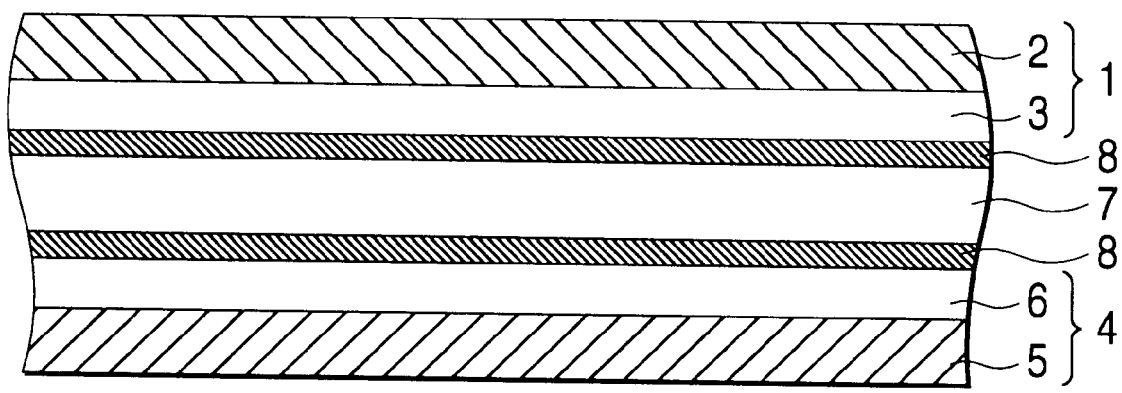
FIG. 1 is a schematic partial cross section of the main part of the secondary lithium ion battery obtained by the process according to the present invention.

Embodiments for carrying out the present invention will be illustrated by referring to the accompanying drawing.

FIG. 1 is a schematic cross section of the main part of a secondary lithium ion battery according to one embodiment of the present invention. In FIG. 1, numeral 1 indicates a positive electrode comprising a current collector 2 made of metal (e.g., aluminum) having formed thereon a positive electrode active material layer 3. Numeral 4 is a negative electrode comprising a current collector 5 made of metal (e.g., copper) having formed thereon a negative electrode active material layer 6. Numeral 7 is a separator in which a lithium ion-containing electrolytic solution is held. Numeral 8 is a binder resin layer which contacts the separator 7 to the positive electrode 1 and the negative electrode 7. The binder resin layers 8 have fine pores, in which the electrolytic solution is held.

Any metal that is stable in a lithium ion secondary battery can be used as a positive or negative electrode current collector 2 or 5. Aluminum is preferred as a positive electrode current collector 2, and copper is preferred as a negative electrode current collector 5. As the current collector foil, net, expanded metal, etc. can be used. Those presenting a large surface area, such as net and expanded metal, are preferred from the standpoint of adhesive strength to the active material layers 3 and 6 and ease of impregnation with an electrolytic solution after contacting.

The active material to be used in the positive electrode active material layer 3 is not particularly limited and includes complex oxides of lithium and a transition metal, such as cobalt, manganese or nickel; complex oxides of lithium and a chalcogen compound or complex oxides of lithium, a chalcogen compound, and a transition metal; and these complex oxide compounds that further contain various dopant elements.

The active material to be used in the negative electrode active material layer 6 preferably includes carbonaceous materials. To the present invention, any conventional negative electrode active material can be used irrespective of chemical characteristics and shape.

Any separator which is insulating and capable of being impregnated with an electrolytic solution, and sufficiently strong, such as porous film, net, and nonwoven fabric, can be used. A porous film of polyethylene or polypropylene is preferred for their adhesiveness and safety.

The binder resin layer 8 can be formed by using a solution of polyvinylidene fluoride as a main binder resin and, if desired, other various homo- or copolymers in a solvent, such as N-methylpyrrolidone.

The electrolytic solution comprises an electrolyte, such as $LiPF_6$, $LiClO_4$, $LiBF_4$, $LiCF_3SO_3$, $LiN(CF_3SO_2)_2$, and $LiC(CF_3SO_2)_3$, and a ether solvent, such as dimethoxyethane, diethoxyethane, diethyl ether, and dimnethyl ether, an ester solvent, such as ethylene carbonate and propylene carbonate, or a mixture thereof.

The process for producing the secondary lithium ion battery shown in FIG. 1 is now described.

Each of an active material for the positive electrode 1 and the negative electrode 4 is mixed with an appropriate amount of a binder resin to prepare a paste. The active material for the positive electrode is additionally mixed with an electrical conducting material, such as graphite powder. The paste is applied to the respective current collectors 2 and 5 and dried to form a positive electrode 1 and a negative electrode 4. The binder resin used here includes the same binder resin used as a binder resin layer 8 and other various resins, such as polyethylene.

A binder resin solution is uniformly applied to the entire surface of a separator by bar coating (a binder resin solution is dropped on the separator and uniformly spread with a bar coater), spray coating (a binder resin solution is sprayed onto the separator) or a like coating technique. In the case that a separator made of a fluorine resin is used, the surface of the separator can be subjected to a plasma treatment to improve the adhesiveness.

If the binder resin solution is applied not to the separator but to the electrodes, the binder resin solution penetrates into the electrodes, and the adhesive strength between the separator and the electrodes is reduced. Further, the lithium ion conducting path is reduced by the penetrating binder resin, resulting in reduction of battery characteristics. In the case that the electrode contains polyvinylidene fluoride as a binder resin, it is dissolved in the solvent of the penetrating binder resin solution, resulting in reduction of electrode strength.

As long as the binder resin solution is applied to the separator, penetration of the binder resin solution into the electrodes and dissolution of the electrode binder resin in the penetrating binder resin solution are avoided, and the adhesion between the separator and the electrodes can be enhanced without causing reduction in electrode strength.

The binder resin layer properly formed on the interface between the separator and each electrode also brings about an improvement of utilization effect of the active material in doping process and de-doping process of lithium ion. Because mobility of lithium ions is equal throughout an electrolytic solution, doping and de-doping process of lithium ions are supported to occur preferentially in the vicinities of the electrode surfaces adjacent to the separator. In the present invention, the binder resin layer formed on the separator is to cover the active material particles in the vicinities of the separator to make them less active than those located in the vicinities of the current collector. As a result, the speed of doping and de-doping process of lithium ions is leveled between the active material in the separator side and that in the current collector side, and the charge and discharge efficiency can be thus improved.

A binder resin solution consisting of 3 to 25 parts by weight, preferably 5 to 15 parts by weight, of polyvinylidene fluoride and 100 parts by weight of dimethylformamide as a solvent is used for preference. If the concentration of the binder resin solution is too low, a sufficient amount of the resin cannot be supplied, only to give insufficient adhesive strength. If the concentration of the solution is too high, too much amount of the resin is coated and ion conduction between electrodes is reduced, and then satisfactory battery characteristics fails to be obtained.

Before the coated binder resin solution dries, the positive and negative electrodes are laminated to the separator and dried under heat and pressure applied from both sides by means of a hot roller, etc. The drying temperature is preferably 60 to 100° C. If the drying temperature is lower than 60° C., dying takes an unfavorably extended time. Temperatures above 100° C. have the possibility of adversely affecting the separator, etc. There are cases in which heating should be continued further so as to dry any residual solvent. In this case, pressure application is not particularly needed. Pressure reduction during heating is effective for time saving but is not essential.

The resulting battery laminate comprising the separator 7 having on each side thereof the positive electrode 1 and the negative electrode 4 is then put in a package made of a resin coated aluminum laminate film and impregnated with an electrolytic solution under reduced pressure. The package is heat sealed to complete a secondary lithium ion battery.

As described above, the present invention succeeded in preventing separation between each electrode and the separator and providing a battery which can retain its battery structure without using a rigid case. Accordingly, the present invention has now made it feasible to provide a secondary lithium ion battery with reduced weight and thickness and having satisfactory charge and discharge characteristics owing to the binder resin layer formed on both sides of the separator. In addition, when any outer force that may deform a battery or an internal thermal stress is applied, it is not between the separator and the active material layer but between the current collector and the electrode material layer that is broken, whereby safety can be secured.

It is preferable to use dimethylformamide whose boiling point is lower than that of N-methylpyrrolidone (202° C.) and which is capable of dissolving a binder resin mainly comprising polyvinylidene fluoride as a solvent of the binder resin solution to be applied onto the separator. In this case, the time required for evaporating the solvent can be shortened. The polyvinylidene fluoride concentration in the dimethylformamide solution is preferably 3 to 25 parts by weight, still preferably 5 to 15% by weight, per 100 parts by weight of dimethylformamide. By selecting the concentration of the binder in the solution within the range, battery characteristics is improved more preferably.

It is also preferable to carry out the drying of the battery laminate by heating in an air stream at a temperature of not higher than 80° C. In this case, the time required for drying can be shortened. Therefore polyvinylidene fluoride in the electrode active material layer is prevented to be solute in the binder resin solution. Therefore the electrode active material layer is prevented to be peeled from electrode collector. In the case that an air stream of a temperature exceeds 80° C., the separator is shrunk and get to be non-porous and damaged adhessivity of battery laminate.

The present invention will be illustrated in greater detail with reference to Embodiments. FIG. 1 is referred to. Unless otherwise noted, all the parts are by weight.

EMBODIMENT 1

Preparation of Positive Electrode

Eighty-seven parts of $LiCoO_2$, 8 parts of graphite powder, and 5 parts of polyvinylidene fluoride (hereinafter abbreviated as PVDF) were dispersed in N-methylpyrrolidone (hereinafter abbreviated as NMP) to prepare a positive electrode active material paste. The paste was applied to a thickness of 300 μm by using a doctor blade method; and a 30 μm thick aluminum net as a current collector 2 was put thereon. The paste was again applied to the non-covered side of the current collector 2 to a thickness of 300 μm by using a doctor blade method. The laminate was semi-dried by allowing to stand in a drier set at 60° C. for 60 minutes, followed by pressing to prepare a positive electrode 1 having a thickness of 400 μm.

After immersion in an electrolytic solution, the peel strength between the active material layer and the current collector was 20 to 25 gf/cm.

Preparation of Negative Electrode

Ninety-five parts of Mesophase Mcrobead Carbon (produced by Osaka Gas Co., Ltd.) and 5 parts of PVDF were dispersed in NMP to prepare a negative electrode active material paste. The paste was applied to a thickness of 300 μm using a doctor blade method, and a 20 μm thick copper net of band form as a current collector 5 was put thereon. The paste was again applied to the non-covered side of the current collector 5 a thickness of 300 μm by using a doctor blade. The laminate was semi-dried by allowing to stand in a drier set at 60° C. for 60 minutes, followed by pressing to prepare a negative electrode 4 having a thickness of 400 μm.

After immersion in an electrolytic solution, the peel strength between the active material layer 6 and the current collector 5 was 5 to 10 gf/cm.

Preparation of Battery

Five parts of PVDF and 95 parts of NMP were mixed and thoroughly stirred to prepare a uniform binder resin solution. The binder resin solution was cropped on a continuous porous polypropylene sheet (Cellguard #2400, produced by Hoechst Celanese Plastics Ltd.) as a separator 7, and a bar coater (a glass tube of 1 cm in diameter with a filament of 0.5 mm in diameter finely wound therearound) was moved thereon to apply the binder resin solution uniformly over the entire surface of the separator.

Before the binder resin dried, the negative electrode 4 was intimately laminated thereto. The other side of the separator was similarly coated with the binder resin solution with a bar coater, and the positive electrode 1 was intimately laminated thereto. The resulting battery laminate was heated in a drier set at 60° C. with no air flow to remove the solvent NMP. As the solvent evaporated, the binder resin layer became a porous film having continuous pores.

The resulting battery laminate was put in an aluminum laminate film pack and impregnated with an electrolytic solution consisting of 1.0 mol/$dm^3$ of lithium hexafluorophosphate (produced by Tokyo Kasei) in a 1:1 (by mole) mixed solvent of ethylene carbonate (produced by Kanto Chemical Co., Ltd.) and 1,2-dimethoxyethane (produced by Wako Pure Chemical Industries, Ltd.). The aluminum laminate film pack was heat-sealed to complete a lithium ion secondary battery.

EMBODIMENT 2

A lithium ion secondary battery was produced in the same manner as in Embodiment 1, except for replacing NMP with dimethylformamide as a solvent of the binder resin solution. The time required for evaporating the solvent was shorter than that in Embodiment 1.

EMBODIMENT 3

A lithium ion secondary battery was produced in the same manner as in Embodiment 1, except for replacing NMP with dimethylformamide as a solvent of the binder resin solution, and the drying step was carried out by exposing the battery laminate in an air flow of 60° C. The time required for evaporating the solvent was shorter than that in Embodiment 1 and 2. Therefore binder resin can be prevented from being solute into the electrode active material layer.

The lithium ion secondary batteries obtained in Embodiments 1 to 3 were subjected to a peel test. The adhesive strength between the positive electrode 1 and the separator 7 and between the negative electrode 4 and the separator 7 was 23 gf/cm and 12 gf/cm, respectively, which was higher than the adhesive strength between the electrodes and the respective current collectors 2 and 5.

On evaluating the battery characteristics, the energy density per unit weight was 100 Wh/kg and, even after 200 charge and discharge cycles at a current of C/2, the charge capacity was as high as 75% of the initial level in each case.

The process according to the present invention comprises the steps of forming a positive electrode and a negative electrode by providing a positive electrode active material layer and a negative electrode active material layer on respective current collectors, applying a binder resin solution consisting mainly of polyvinylidene fluoride and a solvent on to a separator, forming a battery laminate by contacting the positive electrode and the negative electrode each on each side of the separator and drying the laminate to evaporate the solvent, and impregnating the battery laminate with an electrolytic solution. According to this process, separation of each electrode from the separator can be prevented so that the battery structure can be retained without using a rigid case. As a result, it is possible to reduce the weight and thickness of a battery, and there is provided a secondary lithium ion battery having satisfactory charge and discharge characteristics. When any outer force that may deform a battery or an internal thermal stress is applied, it is not between the separator and the active material layer but between the current collector and the electrode material layer that is broken, whereby safety can be secured.

According to the preferred embodiment, in which the binder resin solution consists of 3 to 25 parts by weight, preferably 5 to 15 parts by weight, of polyvinylidene fluoride and 100 parts by weight of dimethylforamide as a solvent, the time required for the drying step for evaporating the solvent can be reduced, and yet the resulting secondary lithium ion battery has excellent charge and discharge characteristics.

According to another preferred embodiment, in which the drying of the battery laminate is carried out in an air stream at 80° C. or lower, the time required for the drying can be shorted.

According to still another preferred embodiment, in which the separator is subjected to a plasma treatment prior to the application of the binder resin solution, the adhesion between the separator and the electrodes can further be improved.

What is claimed is:

1. A method of fabricating a secondary lithium ion battery, comprising:

forming a positive electrode and a negative electrode by placing each of a positive electrode active material layer and a negative electrode active material layer on a current collector;

applying a binder resin solution consisting essentially of polyvinylidene fluoride and a solvent onto each side of a separator;

forming a battery laminate by contacting the positive electrode with the resin layer on one side of the separator and the negative electrode with the resin layer on the other side of the separator;

drying the laminate to evaporate the solvent; and thereafter impregnating the battery laminate with an electrolyte solution.

2. The method of claim 1, wherein said binder resin solution consists of 3–25 parts by weight of polyvinylidene fluoride and dimethylformamide as a solvent.

3. The method of claim 1, wherein said solvent is dimethylformamide or N-methylpyrrolidone.

4. The method of claim 1, wherein said binder resin solution consists of 5–15 parts by weight of polyvinylidene fluoride and dimethylformamide as a solvent.

5. The method of claim 2, wherein said drying is conducted in an air stream at 80° C. or less.

6. The method of claim 1, wherein the surfaces of the separator are subjected to a plasma treatment prior to applying the binder resin solution onto each surface of the separator.

7. The method of claim 1, wherein the battery laminate is formed by heating a laminated body while compressing the laminate.

8. The method of claim 7, wherein said electrolyte impregnation comprises dipping the laminated body into a lithium ion-containing electrolytic solution and injecting the electrolyte into the separator component by reducing the pressure on the lithium ion-containing electrolytic solution.

9. The method of claim 7, wherein said electrolyte impregnation further comprises drying the laminated body while heating the body.

10. The method of claim 1, wherein said collector is an aluminum or copper foil, net or expanded metal.

11. The method of claim 1, wherein said positive electrode active material is a complex oxide of lithium and cobalt, manganese or nickel; a complex oxide of lithium and a chalcogen compound or a complex oxide of lithium, a chalcogen compound and a transition metal.

12. The method of claim 1, wherein said negative electrode active material layer contains a carbonaceous material.

13. The method of claim 1, wherein said separator is in the form of a porous film, net or non-woven fabric.

14. The method of claim 1, wherein said separator is a porous polyethylene or polypropylene film.

15. The method of claim 1, wherein said electrolytic solution comprises an electrolyte of $LiPF_6$, $LiClO_4$, $LiBF_4$, $LiCF_3SO_3$, $LiN(CF_3SO_2)_2$, and $LiC(CF_3SO_2)_3$, in a solvent of dimethoxyethane, diethoxyethane, diethyl ether, dimethyl ether, ethylene carbonate or propylene carbonate.

16. The method of claim 1, wherein said impregnation occurs by:

covering the laminated body with a flexible package;

fitting the flexible package air-tightly to the outsides of the laminated body by exhausting the flexible package;

injecting a lithium ion-containing electrolytic solution from an opening in the flexible package into said separator and said active materials layers and therebetween of the laminated body; and sealing the opening of the flexible package.

17. The method of claim 16, wherein the flexible package is formed of resin laminated aluminum and sealing of the flexible package occurs by the application of heat under pressure.

* * * * *

UNITED STATES PATENT AND TRADEMARK OFFICE
CERTIFICATE OF CORRECTION

PATENT NO. : 6,024,773
DATED : February 15, 2000
INVENTOR(S): Takayuki INUZUKA, et al.

It is certified that an error appears in the above-identified patent and that said Letters Patent is hereby corrected as shown below:

On the title page, item [73], the Assignee's name is incorrect. It should be:

--[73] Assignee: Mitsubishi Denki Kabushiki Kaisha, Tokyo, Japan--

Signed and Sealed this

Twenty-seventh Day of February, 2001

Attest:

NICHOLAS P. GODICI

*Attesting Officer*    *Acting Director of the United States Patent and Trademark Office*